C. F. JENKINS.
FILM REEL.
APPLICATION FILED OCT. 22, 1917.
1,343,628. Patented June 15, 1920.
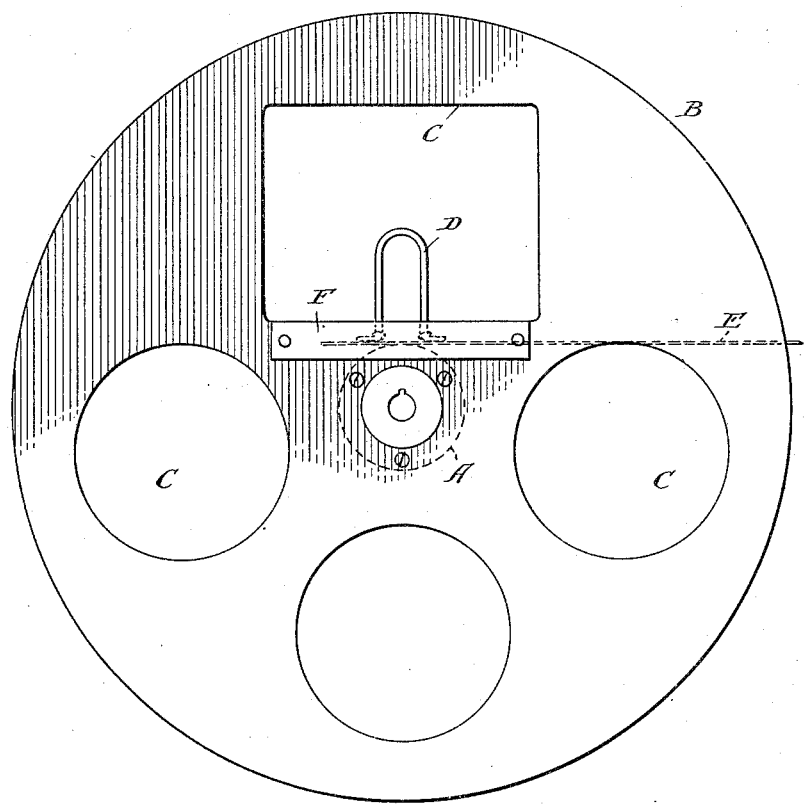
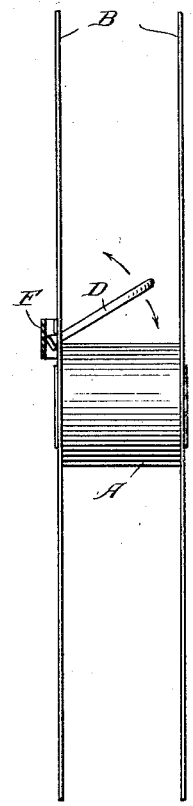
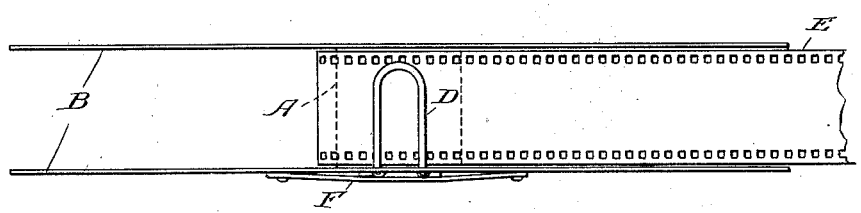
Inventor
Charles Francis Jenkins
By Greene & Greene
Attorneys
Witness
Edwin L. Bradford

UNITED STATES PATENT OFFICE.

CHARLES FRANCIS JENKINS, OF WASHINGTON, DISTRICT OF COLUMBIA.

FILM-REEL.

1,343,628.     Specification of Letters Patent.     Patented June 15, 1920.

Application filed October 22, 1917. Serial No. 197,926.

*To all whom it may concern:*

Be it known that I, CHARLES FRANCIS JENKINS, a citizen of the United States, and resident of Washington, in the District of Columbia, have invented certain new and useful Improvements in Film-Reels, of which the following is a specification, reference being had therein to the accompanying drawing.

For holding the end portion of a film which it is proposed to wind upon a reel, the usual reel drum is provided with a spring under which the film end is slipped with difficulty, or the drum is provided with a slot into which the film end is inserted, or other devices are used which either always or frequently destroy the terminal portion of the film. None of these devices is always successfully and quickly operated either in the dark or in the light, and large numbers of spectators are therefore forced to wait, and the operator is subjected to vexation and censure for delay that is practically unavoidable.

To remedy these evils I add to the reel a manually operable device for movably fixing the film with respect to the reel drum and frictionally holding it so that it will not slip in winding but may be instantly freed by a strong pull.

In the accompanying drawings,

Figure 1 is a side elevation of a reel provided with my devices.

Fig. 2 is a view looking from above in Fig. 1.

Fig. 3 is a view looking from the right in Fig. 1.

Fig. 4 is a detached view of a film holding member.

In these figures, A represents a reel drum having end plates B provided with large openings C between the drum and the margins of the plate, and D is an arm or clip reached through one of the holes C and movable manually against the film E upon which it rests and, preferably is held by spring action.

The arm is shown as U-shaped with the end portion of each branch of the U turned outward, to lie in a slight depression in the plate, and flattened so that when the arm is swung down against the film a spring F riveted to the plate may press against this flattened side and yieldingly resist outward movement of the arm. The arm is of such width that the drum curves away from its sides, when the film is being held, so that the fingers readily engage the arm to swing it from film-holding position and against its plate where it is lightly held by the spring with its end in position to be pushed again, instantly, to holding position by the fingers.

It is not material that the arm should extend fully across the film since no great holding force is required, the arm being required simply to hold the film until one or two turns are made.

In use, the arm is swung out of the plane in which the film winds, the film is laid upon the drum and the arm is pushed inward by the finger pressing the arm-portion exposed at one of the openings. When the spring form is used, the finger merely starts the movement of the arm and the spring acting against the flattened sides of the terminal portions of the arms sweeps the arm down upon the film clamping it to the drum.

The film may be first clamped at a distance from its end and may then be readily pulled along under the arm as far as may be desired. The difficult manipulation of film between the large slightly separated end plates is avoided, and clamping is instantaneous.

It is further to be noted that no part at any time projects or can project from the ordinary parts of the reel to be broken off or injured in the rough handling to which heavy loaded reels are often subjected.

What I claim is:

1. The combination with a film reel having a finger opening in one end plate, of a film clamping member mounted to swing inwardly against the reel drum and outwardly into said opening, and means for resisting its further movement when it has reached either limit of its normal path.

2. The combination with a film reel, of a film clamping arm pivoted to one end plate to swing to and from the drum, and means for yieldingly resisting swinging of the arm from either limit of its normal path, one of reel's end plates having an opening allowing said arm to be engaged by the fingers when at either limit of its path.

3. The combination with a film reel, of an arm pivoted to the reel to swing from a position outside of the path of film winding on the reel to film clamping position on the drum, and means automatically brought into action as the arm reaches either limit of its normal path for offering spring resistance to further change of the arm's position.

4. The combination with a film reel drum having one end plate provided with a finger opening, of a film clamping arm pivoted to said end plate to swing, in the plane of the drum's axis, inwardly to meet the drum and outwardly into said opening, a flat spring parallel to the end plate, fixed thereto in position for permanently covering the pivoted end of the arm and arranged to offer yielding resistance to movement of the arm from the plane of the end plate and from the drum.

In testimony whereof I hereunto affix my signature.

CHARLES FRANCIS JENKINS.